United States Patent
Seok et al.

(10) Patent No.: US 11,250,242 B2
(45) Date of Patent: Feb. 15, 2022

(54) EYE TRACKING METHOD AND USER TERMINAL PERFORMING SAME

(71) Applicant: VisualCamp Co., Ltd., Kyungido (KR)

(72) Inventors: Yoon Chan Seok, Seoul (KR); Tae Hee Lee, Seoul (KR)

(73) Assignee: VisualCamp Co., Ltd., Kyungido (KR)

( * ) Notice: Subject to any disclaimer, the term of this patent is extended or adjusted under 35 U.S.C. 154(b) by 0 days.

(21) Appl. No.: 16/646,326

(22) PCT Filed: Apr. 19, 2018

(86) PCT No.: PCT/KR2018/004562
§ 371 (c)(1),
(2) Date: Mar. 11, 2020

(87) PCT Pub. No.: WO2019/054598
PCT Pub. Date: Mar. 21, 2019

(65) Prior Publication Data
US 2020/0272807 A1    Aug. 27, 2020

(30) Foreign Application Priority Data

Sep. 13, 2017  (KR) ......................... 10-2017-0117059
Dec. 7, 2017   (KR) ......................... 10-2017-0167334

(51) Int. Cl.
G06K 9/00   (2006.01)
G06F 3/01   (2006.01)
G06K 9/62   (2006.01)

(52) U.S. Cl.
CPC ......... *G06K 9/00248* (2013.01); *G06F 3/013* (2013.01); *G06K 9/00255* (2013.01); *G06K 9/00281* (2013.01); *G06K 9/6256* (2013.01)

(58) Field of Classification Search
CPC .......... G06K 9/00248; G06K 9/00281; G06K 9/00255; G06K 9/6256; G06K 9/0061; G06K 9/629; G06F 3/013
See application file for complete search history.

(56) References Cited

U.S. PATENT DOCUMENTS 9,591,427 B1 *   3/2017  Lyren ..................... H04S 7/301
10,719,951 B2 *  7/2020  Kaehler .............. G06F 3/04815
(Continued)

FOREIGN PATENT DOCUMENTS

JP   2007-265367 A    10/2007
KR   10-0325365 B1    3/2002
(Continued)

OTHER PUBLICATIONS

International Search Report for PCT/KR2018/004562 dated Aug. 17, 2018.

*Primary Examiner* — Wesley J Tucker
(74) *Attorney, Agent, or Firm* — The PL Law Group, PLLC

(57) ABSTRACT

A user terminal according to an embodiment of the present invention includes a capturing device for capturing a face image of a user, and an eye tracking unit for, on the basis of a configured rule, acquiring, from the face image, a vector representing the direction that the face of the user is facing, and a pupil image of the user, and performing eye tracking of the user by inputting, in a configured deep learning model, the face image, the vector and the pupil image.

16 Claims, 12 Drawing Sheets

(56) References Cited

U.S. PATENT DOCUMENTS

| | | | | |
|---|---|---|---|---|
| 2007/0230797 | A1* | 10/2007 | Hisanaga | A61B 3/113 |
| | | | | 382/195 |
| 2015/0278599 | A1* | 10/2015 | Zhang | G06T 7/80 |
| | | | | 348/78 |
| 2015/0309569 | A1* | 10/2015 | Kohlhoff | G06F 3/04842 |
| | | | | 345/156 |
| 2016/0109945 | A1* | 4/2016 | Kempinski | G06F 3/013 |
| | | | | 348/78 |
| 2017/0290504 | A1* | 10/2017 | Khaderi | A61B 5/165 |
| 2019/0171283 | A1* | 6/2019 | Dey | G06N 20/00 |
| 2020/0004333 | A1* | 1/2020 | Lee | G06F 3/04817 |
| 2020/0394408 | A1* | 12/2020 | Sydorenko | G06K 9/00604 |
| 2021/0004082 | A1* | 1/2021 | Suk | G06T 7/73 |
| 2021/0056306 | A1* | 2/2021 | Hu | G06K 9/6262 |

FOREIGN PATENT DOCUMENTS

| | | |
|---|---|---|
| KR | 10-2013-0088666 A | 8/2013 |
| KR | 10-1479471 B1 | 1/2015 |
| KR | 10-2015-0129051 A | 11/2015 |
| KR | 10-2016-0072015 A | 6/2016 |

\* cited by examiner

EYE TRACKING METHOD AND USER TERMINAL PERFORMING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/004562 filed on Apr. 19, 2018, which claims priority to the benefit of Korean Patent Application Nos. 10-2017-0117059 filed on Sep. 13, 2017 and 10-2017-0167334 filed on Dec. 7, 2017 in the Korean Intellectual Property Office, the entire contents of which are incorporated herein by reference.

TECHNICAL FIELD

The present invention relates to an eye tracking technology.

BACKGROUND ART

Eye tracking is a technology for tracking the location of a gaze by sensing the ocular movement of a user, and video analysis methods, contact lens methods, sensor attachment methods, or the like may be used as eye tracking methods. According to a video analysis method, the movement of a pupil is detected through real-time camera image analysis, and the direction of a gaze is calculated on the basis of a fixed position which reflects onto the cornea. According to a contact lens method, the reflected light of a mirror contact lens, the magnetic field of a coil contact lens, or the like is used. The contact lens method has low convenience but high accuracy. According to a sensor attachment method, a sensor is attached to the vicinity of an eye, and ocular movement is sensed using a change in electric field caused by the movement of the eye. It is possible to detect ocular movement even when the eye is closed (during sleep or the like).

Recently, the eye tracking technology is gradually being applied to a greater variety of equipment and wider application fields. Accordingly, in providing an advertising service in a terminal, such as a smart phone, attempts to use the eye tracking technology are increasing. However, in order to efficiently provide an advertising service, it is necessary to improve the accuracy of eye tracking and efficiently configure a bidding method, a reward method, etc. according to advertisement watching.

SUMMARY

The present invention is directed to providing a means for improving the accuracy of eye tracking when eye tracking is performed on the basis of deep learning.

One aspect of the present invention provides a user terminal including an imaging device configured to capture a face image of a user and an eye tracking unit configured to acquire a vector representing a direction that a face of the user faces and an ocular image of the user from the face image on the basis of set rules and track a gaze of the user by inputting the face image, the vector, and the ocular image to a set deep learning model.

The user terminal may further include a training data collection unit configured to collect training data including a face image of a viewer captured at a time point of receiving a set action and location information of a set point when the set action is received from the viewer who looks at the set point in a screen, and the eye tracking unit may train the deep learning model with the training data and track the gaze of the user using the deep learning model which has learned the training data.

When the viewer touches the point, the training data collection unit may collect the training data at a time point at which the touch is made.

The training data collection unit may collect the training data by operating the imaging device at the time point at which the viewer touches the point.

The training data collection unit may transmit the training data collected at the time point at which the viewer touches the point to a server.

When the viewer touches the point while the imaging device is operating, the training data collection unit may separately collect the training data at the time point at which the touch is made and time points a set time before and after the time point at which the touch is made.

The training data collection unit may change a visual element of the point after the viewer touches the point so that a gaze of the viewer may remain at the point even after the touch.

The training data collection unit may display set text at the point and collect the training data at a time point at which an utterance of the viewer is started when the viewer speaks.

The eye tracking unit may acquire ocular location coordinates and face location coordinates of the user from the face image on the basis of the rules and additionally input the ocular location coordinates and the face location coordinates to the deep learning model together with the vector representing the direction that the face of the user faces.

The user terminal may further include a content providing unit configured to display advertising content on the screen, the eye tracking unit may determine whether the user is watching the advertising content on the basis of a detected gaze of the user and a location of the advertising content in the screen, and the content providing unit may change the location of the advertising content in the screen by considering the location of the advertising content in the screen and a time period for which the user has watched the advertising content.

Another aspect of the present invention provides an eye tracking method including: capturing, by an imaging device, a face image of a user; acquiring, by an eye tracking unit, a vector representing a direction that a face of the user faces and an ocular image of the user from the face image on the basis of set rules; and inputting, by the eye tracking unit, the face image, the vector, and the ocular image to a set deep learning model to track a gaze of the user.

The eye tracking method may further include: when a set action is received from a viewer who looks at a set point in a screen, collecting, by a training data collection unit, training data including a face image of the viewer captured at a time point of receiving the set action and location information of the set point; and training, by the eye tracking unit, the deep learning model with the training data. The tracking of the gaze of the user may include tracking the gaze of the user by using the deep learning model which has learned the training data.

The collecting of the training data may include, when the viewer touches the point, collecting the training data at a time point at which the touch is made.

The collecting of the training data may include collecting the training data by operating the imaging device at the time point at which the viewer touches the point.

The eye tracking method may further include transmitting, by the training data collection unit, the training data collected at the time point at which the viewer touches the point to a server.

The collecting of the training data may include, when the viewer touches the point while the imaging device is operating, separately collecting the training data at the time point at which the touch is made and time points a set time before and after the time point at which the touch is made.

The eye tracking method may further include changing, by the training data collection unit, a visual element of the point after the viewer touches the point so that a gaze of the viewer may remain at the point even after the touch.

The collecting of the training data may include displaying set text at the point and collecting, when the viewer speaks, the training data at a time point at which an utterance of the viewer is started.

The eye tracking method may further include acquiring, by the eye tracking unit, ocular location coordinates and face location coordinates of the user from the face image on the basis of the rules, and the tracking of the gaze of the user may include additionally inputting the ocular location coordinates and the face location coordinates to the deep learning model together with the vector representing the direction that the face of the user faces.

The eye tracking method may further include: displaying, by a content providing unit, advertising content on the screen; determining, by the eye tracking unit, whether the user is watching the advertising content on the basis of a detected gaze of the user and a location of the advertising content in the screen; and changing, by the content providing unit, the location of the advertising content in the screen by considering the location of the advertising content in the screen and a time period for which the user has watched the advertising content.

According to embodiments of the present invention, it is possible to improve the accuracy of eye tracking by using a vector representing a direction that the face of a user faces as well as a face image and an ocular image of the user as input data of a deep learning model in the case of eye tracking based on the deep learning model.

Also, according to the embodiments of the present invention, when an action, such as a touch or an utterance, is input from a viewer who is looking at a set point in a screen, a face image of the viewer captured at a time point at which the action is input and location information of the point is used as training data of a deep learning model for eye tracking. Consequently, it is possible to improve the accuracy and reliability of eye tracking.

DETAILED DESCRIPTION

Hereinafter, detailed embodiments of the present invention will be described with reference to the drawings. The following detailed description is provided to assist in comprehensive understanding of a method, device, and/or system set forth herein. However, the detailed description is merely an example, and the present invention is not limited thereto.

In describing the embodiments of the present invention, when a detailed description of a known art related to the present invention is deemed as unnecessarily obscuring the gist of the present invention, the detailed description will be omitted. In addition, terms to be described below are those defined in consideration of functions in the present invention and may vary depending on intentions, practices, or the like of a user or an operator. Therefore, the terms should be defined on the basis of content throughout this specification. Terms used in the detailed description are merely for describing the embodiments of the present invention and should not be considered as limiting. Unless clearly used otherwise, a singular expression includes a plural meaning. In the description, terms such as "include" and "have" are for indicating certain features, numbers, steps, operations, elements, and a part or combination thereof and should not be construed as excluding the presence or possibility of one or more other features, numbers, steps, operations, elements, and a part or combination thereof.

Figure 1:
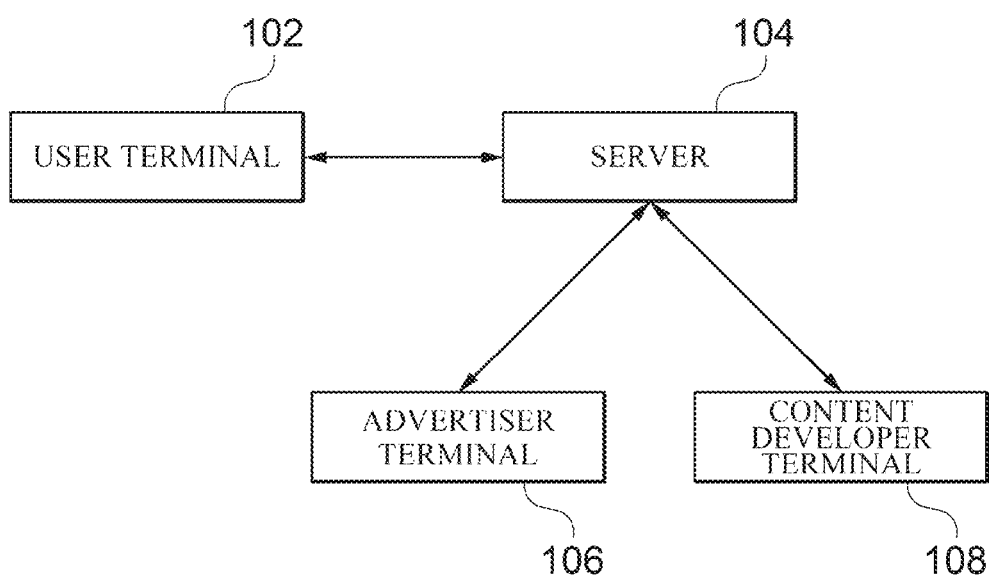
FIG. 1 is a block diagram illustrating a detailed configuration of an advertising system according to an embodiment of the present invention.

FIG. 1 is a block diagram illustrating a detailed configuration of an advertising system 100 according to an embodiment of the present invention. As shown in FIG. 1, the advertising system 100 according to the embodiment of the present invention includes a user terminal 102, a server 104, an advertiser terminal 106, and a content developer terminal 108.

The user terminal 102 is equipment that is possessed by a user to receive various advertising services and may be mobile equipment such as a smart phone, a tablet personal computer (PC), or a laptop computer. However, a kind of the user terminal 102 is not limited thereto, and various types of communication equipment having a screen for displaying advertising content and an imaging device for photographing the user may correspond to the user terminal 102 according to embodiments of the present invention.

The user terminal 102 may have a screen and display advertising content through the screen. Also, the user terminal 102 may have an imaging device, such as a camera or a camcorder, and track the gaze of the user from a face image of the user captured through the imaging device. Accordingly, the user terminal 102 may determine whether the user is watching the advertising content on the basis of a detected gaze of the user and the location of the advertising content in the screen. In this case, the user terminal 102 may receive a set mobile application from the server 104 and perform a function of providing the advertising content, an eye tracking function, etc. in conjunction with the screen, the imaging device, etc. therein through the application.

In addition, the user terminal 102 may track the gaze of the user using a set rule-based algorithm and a deep learning model. Here, the rule-based algorithm is an algorithm used to acquire various kinds of data for eye tracking by using a predetermined video processing technique, image processing technique, equation, and the like. The rule-based algorithm may be, for example, a face recognition algorithm (e.g., principal component analysis (PCA) or linear discriminant analysis (LDA)), a facial feature point detection algorithm (e.g., support vector machine (SVM) or speeded up robust features (SURF)), an image-based head-tracking algorithm, an algorithm for extracting pupils and calculating the location coordinates of pupils, and the like. Also, the deep learning model may be, for example, a convolutional neural network (CNN) model.

The server 104 relays various kinds of data for providing an advertising service between the user terminal 102 and the advertiser terminal 106. As shown in FIG. 1, the server 104 may be connected to each of the terminal 102, the advertiser terminal 106, and the content developer terminal 108 through a network (not shown). The server 104 may provide a mobile application for providing an advertising service to the terminal 102 according to a request from the terminal 102. The terminal 102 may access the server 104 through the mobile application and provide various advertising services provided by the server 104 to the user. Also, the server 104 may receive advertising content from the content developer terminal 108 in conjunction with the advertiser terminal 106 and provide the advertising content to the terminal 102. Subsequently, the server 104 may collect various types of data related to advertisement effects of the advertising content (e.g., a time period/the number of times that each piece of advertising content has been displayed and a time period/the number of times that each piece of advertising content has been watched) from the terminal and provide the data to the advertiser terminal 106.

The advertiser terminal 106 is a terminal possessed by an advertiser and may be connected to the server 104 through the network. At least one of a plurality of pieces of advertising content provided by the content developer terminal 108 may be selected by the advertiser through the advertiser terminal 106, and the advertiser terminal 106 may provide information on the selected piece of advertising content to the server 104. Also, the advertiser terminal 106 may receive various types of data related to advertisement effects of the advertising content from the server 104.

The content developer terminal 108 is a terminal possessed by a developer who develops advertising content and may be connected to the server 104 through the network. The content developer terminal 108 may provide advertising content created/edited by the content developer to the advertiser terminal 106 through the server 104. The server 104 may receive information on advertising content selected by the advertiser from the advertiser terminal 106 and provide the advertising content corresponding to the information to the user terminal 102.

Figure 2:
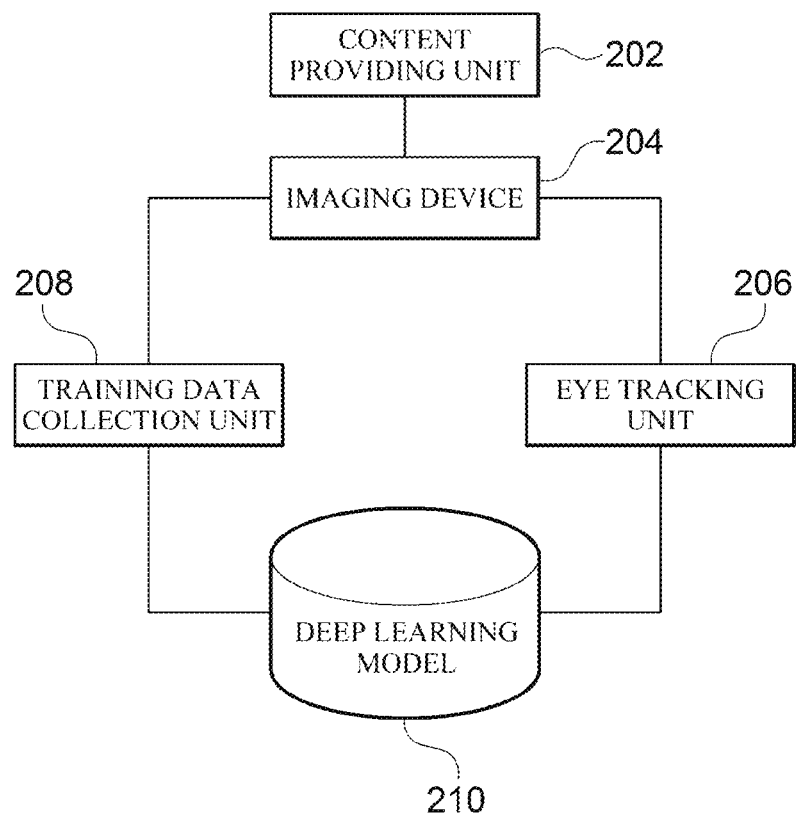
FIG. 2 is a block diagram illustrating a detailed configuration of a terminal according to an embodiment of the present invention.

FIG. 2 is a block diagram illustrating a detailed configuration of the terminal 102 according to an embodiment of the present invention. As shown in FIG. 2, the terminal 102 according to the embodiment of the present invention includes a content providing unit 202, an imaging device 204, an eye tracking unit 206, and a training data collection unit 208.

The content providing unit 202 displays advertising content on the screen of the terminal 102. As an example, the content providing unit 202 may display advertising content on a lock screen. The lock screen is a screen displayed when a touch for unlocking a lock state of the user terminal 102 is input from a user while the user terminal 102 is in the lock state. The content providing unit 202 may display advertising content in the form of text, an image, or a video clip on the lock screen. As another example, when an execution command for a set application, menu, or the like is input from the user, the content providing unit 202 may display advertising content on the screen according to the execution command. However, examples of a screen on which advertising content is displayed are not limited thereto, and the advertising content may be displayed on various preset forms of screens.

The imaging device 204 is a device for photographing a user who is watching the screen of the user terminal 102 and may be, for example, a camera, a camcorder, or the like. For example, the imaging device 204 may be provided on the front side of the user terminal 102. The user terminal 102 may acquire a face image of the user through the imaging device 204 and track the gaze of the user through the face image.

The eye tracking unit 206 tracks the gaze of the user. The eye tracking unit 206 may track the gaze of the user using a set rule-based algorithm and deep learning model. In embodiments of the present invention, deep learning is an artificial neural network (ANN) employing the theory of human neural network and indicates a machine learning model or a set of algorithms which refer to a deep neural network (DNN) configured in a layer structure and having one or more hidden layers between an input layer and an output layer. The eye tracking unit 206 may track the gaze of the user in conjunction with the imaging device 204.

As an example, when the face of the user is sensed by the imaging device 204, the eye tracking unit 206 may track the gaze of the user using the above-described rule-based algorithm and deep learning model. As another example, when the face of the user is not sensed by the imaging device 204, the eye tracking unit 206 may operate in a sleep mode to stop various operations for eye tracking.

When the face of the user is sensed by the imaging device 204, the eye tracking unit 206 may acquire a face image of the user captured through the imaging device 204 and acquire a vector representing a direction that the face of the user faces and an ocular image of the user from the face image on the basis of set rules. Subsequently, the eye tracking unit 206 may input the face image, the vector, and the ocular image to a deep learning model 210 and track the gaze of the user. In this case, the deep learning model is assumed to have already learned a sufficient amount of training data collected by the training data collection unit 208. Also, the eye tracking unit 206 may acquire ocular location coordinates, face location coordinates, an eye direction vector, etc. of the user from the face image on the basis of the rules and input the ocular location coordinates, the face location coordinates, the eye direction vector, etc. to the deep learning model 210. As such, the eye tracking unit 206 may improve the accuracy of eye tracking by inputting not only the face and ocular images of the user but also various types of quantitative data acquired for eye tracking on the basis of the rules to the deep learning model 210.

In addition, the eye tracking unit 206 may determine whether the user is watching the advertising content on the basis of a detected gaze of the user and the location of the advertising content in the screen. As will be described below, the content providing unit 202 may change the location of the advertising content in the screen by considering the location of the advertising content in the screen and a time period for which the user has watched the advertising content.

Figure 3:
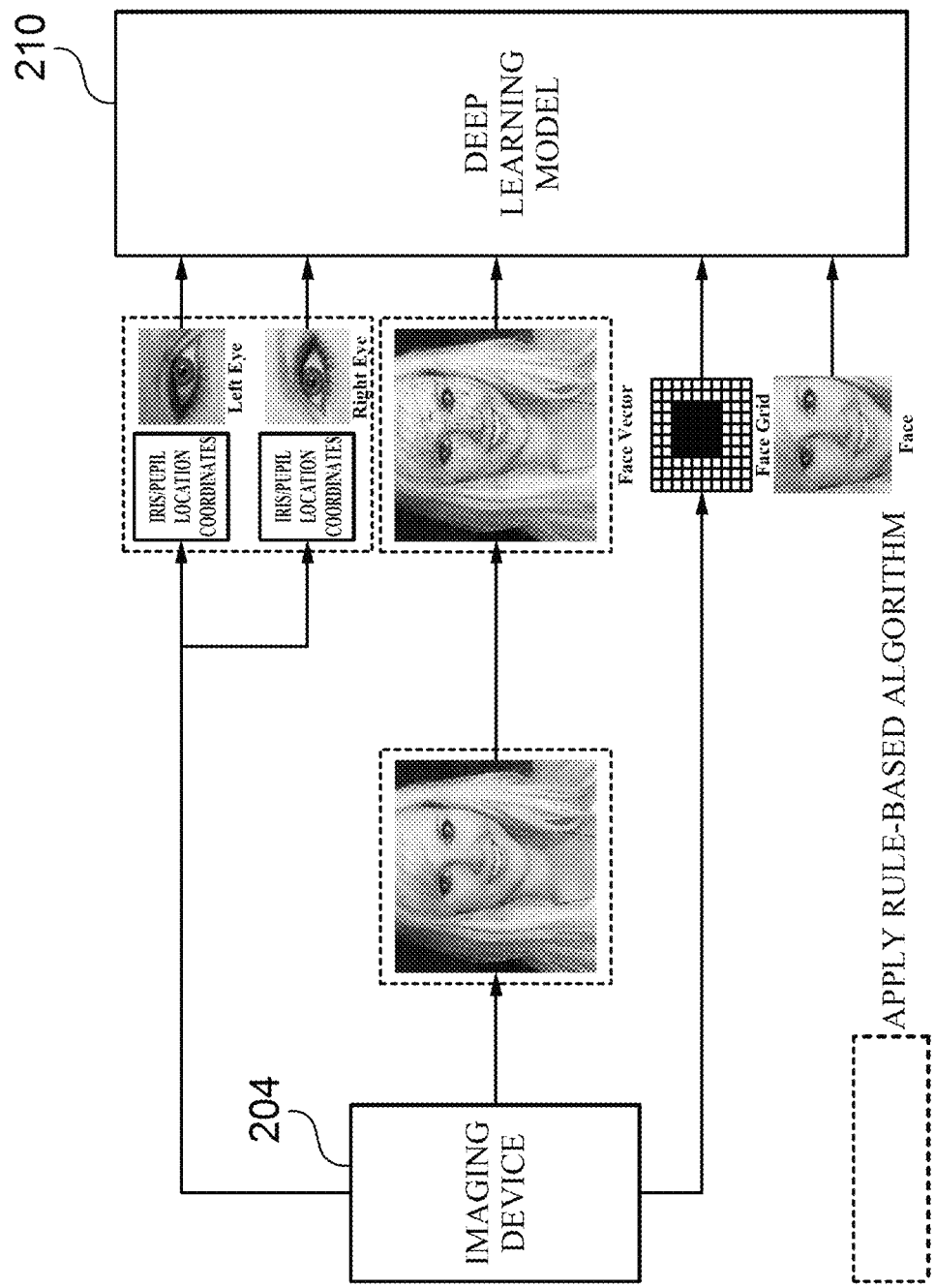
FIG. 3 is a diagram illustrating a process in which an eye tracking unit tracks a gaze of a user according to an embodiment of the present invention.
Figure 4:
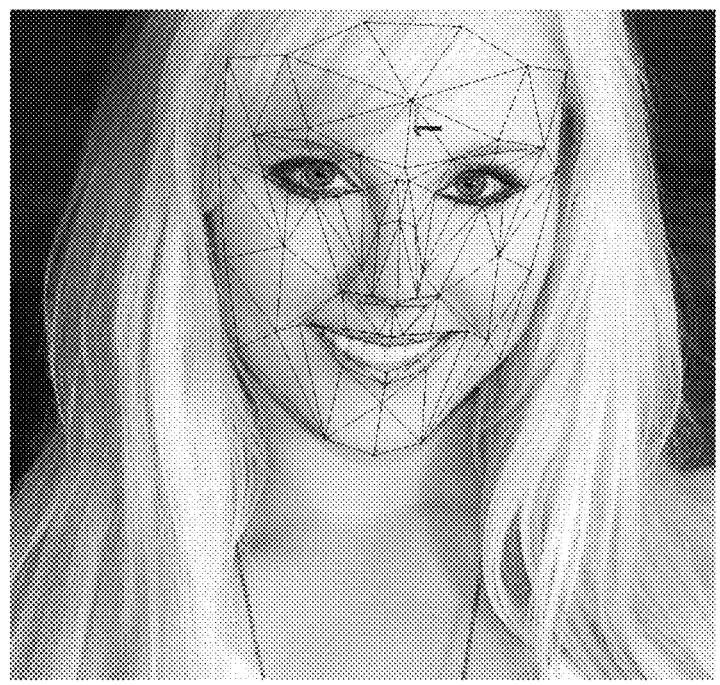
FIG. 4 is an example of a face vector according to an embodiment of the present invention.

FIG. 3 is a diagram illustrating a process in which the eye tracking unit 206 tracks a gaze of a user according to an embodiment of the present invention, and FIG. 4 is an example of a face vector according to an embodiment of the present invention. Also, FIG. 5 is an example illustrating a process of tracking a gaze of a user through the deep learning model 210 according to an embodiment of the present invention.

Referring to FIG. 3, the eye tracking unit 206 may acquire a vector representing a direction that the face of a user faces, an ocular image, ocular location coordinates, etc. by applying a rule-based algorithm to a face image of the user acquired through the imaging device 204. While looking at a specific point, the user generally directs his or her face toward the point, and thus a direction that the face faces is highly likely to coincide with the gaze direction of the user. Accordingly, in embodiments of the present invention, the eye tracking unit 206 may improve the accuracy of eye tracking by using not only the face and ocular images of the user but also the vector representing the direction that the face of the user faces as input data of the deep learning model 210. The eye tracking unit 206 may extract feature vectors of the face image through a predetermined feature point extraction algorithm and acquire the vector representing the direction that the face of the user faces, that is, a face vector, from the feature vectors. An example of a face vector acquired in this way is shown in FIG. 4. Also, the eye tracking unit 206 may detect an eye region in the face image through image processing technique and acquire an image of the eye region (i.e., an ocular image) and iris or ocular location coordinates. In addition, the eye tracking unit 206 may detect a face region of the user in the whole screen and acquire location coordinates of the face region. The eye tracking unit 206 may input the acquired vector, ocular image and location coordinates, face image and location coordinates, etc. to the deep learning model 210.

Figure 5:
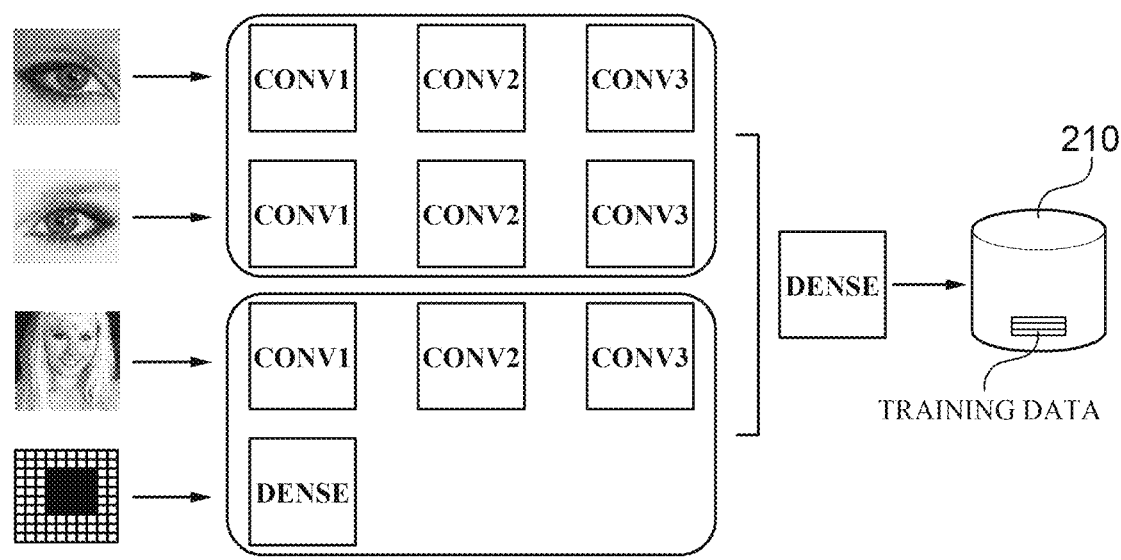
FIG. 5 is an example illustrating a process of tracking a gaze of a user through a deep learning model according to an embodiment of the present invention.

Referring to FIG. 5, the deep learning model 210 may have a plurality of layers configured in a layer structure, and the above-described input data may be input to the layers. It is possible to track the gaze of the user on the basis of training data which has been learned in advance and input data which is newly input.

Meanwhile, training data of the deep learning model 210, that is, training data for eye tracking, should have high reliability so that the eye tracking unit 206 may accurately track the gaze of the user using the deep learning model 210.

To this end, referring back to FIG. 2, the training data collection unit 208 may collect a large amount of training data used for training the deep learning model 210 on the basis of a gaze action. Specifically, when a set action is input from a viewer who looks at a set point in the screen of the user terminal 102, the training data collection unit 208 may collect training data including a face image of the viewer captured through the imaging device 204 at a time point of receiving the action and location information of the set point. The action may be, for example, a screen touch of the viewer or an utterance of the viewer. An embodiment of training data collection is as follows.

EMBODIMENT

When the viewer inputs a pattern for unlocking the lock screen by touching the screen, the imaging device 204 operates to photograph the face of the viewer at a time point at which the touch input of the viewer is initially made→the captured face image of the viewer (or the face image/location coordinates, a vector representing a direction that the face of the viewer faces, or ocular image/location coordinates of the viewer, or the like) and the location information of an initially touched point of the pattern are collected as training data.

When the viewer touches (or clicks) a set application icon or menu button in the screen, the imaging device 204 operates to photograph the face of the viewer at a time point at which the touch input of the viewer is made→the captured face image of the viewer (or the face image/location coordinates, a vector representing a direction that the face of the viewer faces, or ocular image/location coordinates of the viewer, or the like) and the location information of a touched point of the icon or menu button are collected as training data.

One point is displayed on the screen to make the viewer touch the point, and when the viewer touches the point, the imaging device 204 operates to photograph the face of the viewer at a time point at which the touch input of the viewer is made→the captured face image of the viewer (or the face image/location coordinates, a vector representing a direction that the face of the viewer faces, or ocular image/location coordinates of the viewer, or the like) and the location information of the touched point are collected as training data.

Training data collected in this way may be input to and learned by the deep learning model 210. Specifically, the eye tracking unit 206 may train the deep learning model 210 with the training data and track the gaze of the user using the deep learning model 210 which has learned the training data. A method by which the training data collection unit 208 collects training data will be described in further detail below with reference to FIGS. 6 to 9.

Figure 6:
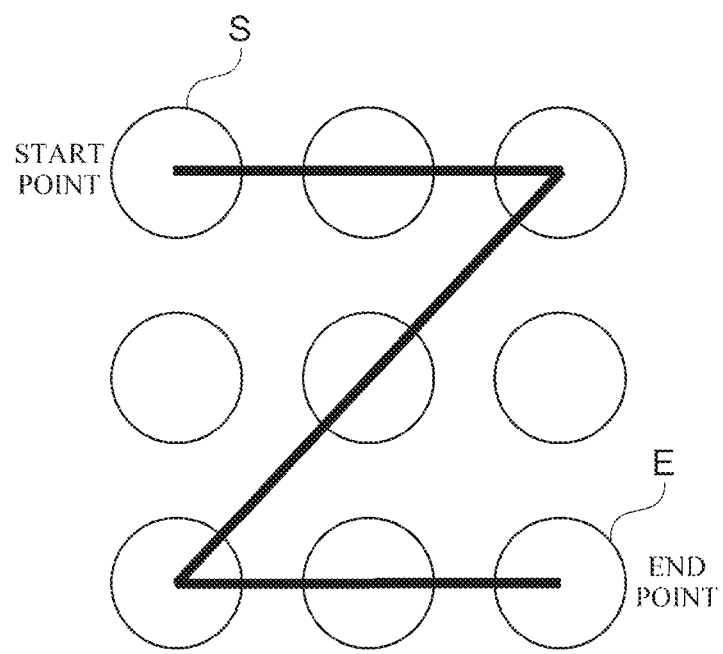
FIG. 6 is an example illustrating a process in which a training data collection unit collects training data which is input to a deep learning model according to an embodiment of the present invention.

FIG. 6 is an example illustrating a process in which the training data collection unit 208 collects training data which is input to the deep learning model 210 according to an embodiment of the present invention.

Referring to FIG. 6, the training data collection unit 208 may display nine points for pattern input on a lock screen. Accordingly, a viewer may input a preset pattern of a Z shape by touching the screen to unlock the lock screen. In this case, the viewer may input the Z-shaped pattern from a start point S to an end point E by touching the screen. The training data collection unit 208 may collect training data including a face image of the viewer captured through the imaging device 204 at a time point at which a touch input of the viewer is initially made, that is, a time point at which the viewer touches the start point S, and the location information of the start point S.

Figure 7:
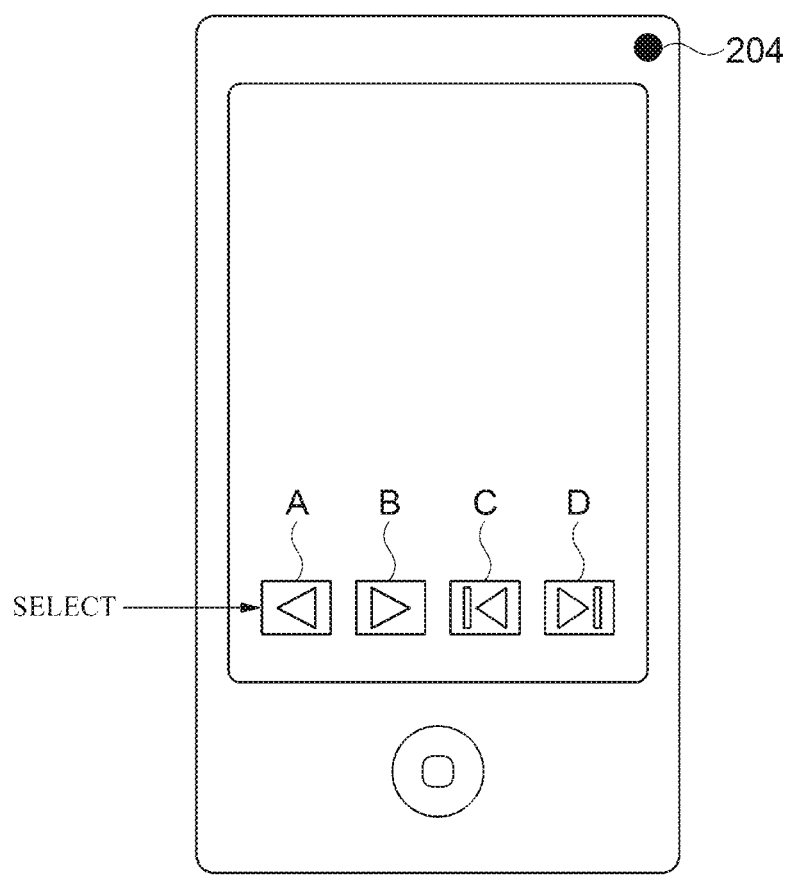
FIG. 7 is another example illustrating a process in which a training data collection unit collects training data which is input to a deep learning model according to an embodiment of the present invention.
Figure 8:
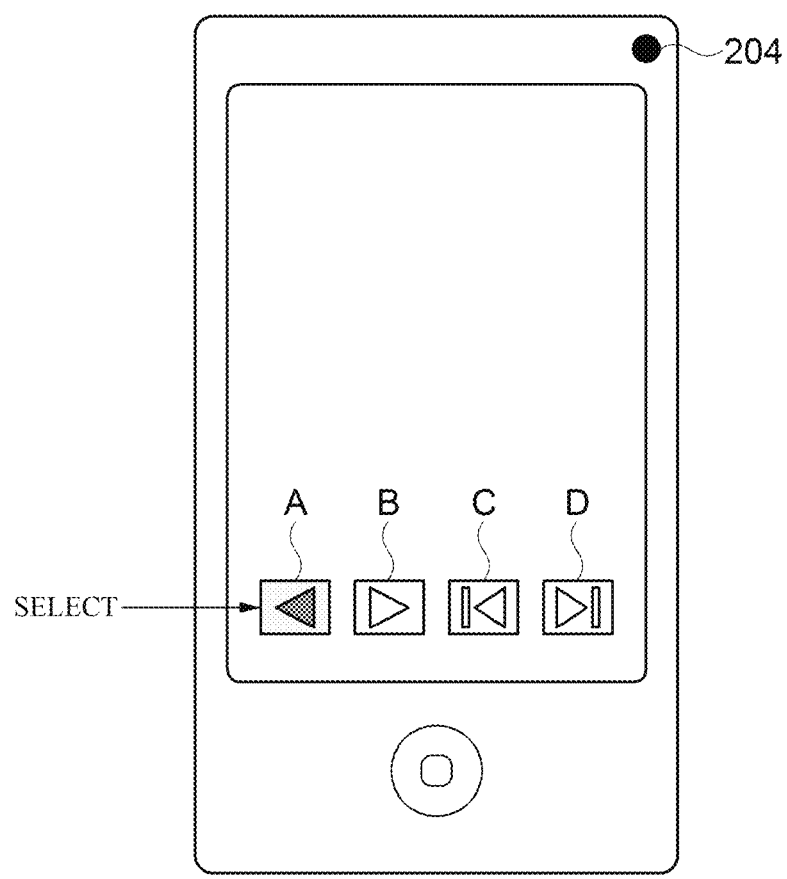
FIG. 8 is an example illustrating a process of changing a visual element of a set point when a viewer touches the set point in FIG. 7.

FIG. 7 is another example illustrating a process in which the training data collection unit 208 collects training data which is input to the deep learning model 210 according to an embodiment of the present invention, and FIG. 8 is an example illustrating a process of changing a visual element of a set point when a viewer touches the set point in FIG. 7.

Referring to FIG. 7, the training data collection unit 208 may display a button A (reward button), a button B (forward button), a button C (start button), a button D (end button), etc. on the screen. When a viewer touches the button A, the training data collection unit 208 may collect training data including a face image of the viewer captured through the imaging device 204 at a time point at which the touch input of the viewer is made, that is, a time point at which the viewer touches the button A, and the location information of the button A.

Also, the training data collection unit 208 may change visual elements at the point after the viewer touches the point so that the gaze of the viewer may remain at the touched point even after the touch. Here, the visual elements are elements required for visually recognizing objects output on the screen and may be, for example, an object output on the screen and the size, shape, color, brightness, etc. of a region including the object or the boundary line of the object.

Referring to FIG. 8, when the viewer touches the button A, the training data collection unit 208 may display the color of the button A darker, and accordingly the gaze of the viewer may be made to remain at the button A even after the touch.

Meanwhile, the training data collection unit 208 may operate the imaging device 204 to collect the training data at a time point at which the viewer touches a set point. In other words, the imaging device 204 may usually be maintained in an off state and operated by the training data collection unit 208 to photograph the viewer at a time point at which the viewer touches the set point. Accordingly, it is possible to prevent the battery consumption of the user terminal 102 from being increased by continuous operation of the imaging device 204. Also, the training data collection unit 208 may transmit the face image of the viewer captured at the time point at which the viewer touches the point and the location information of the point (i.e., training data collected at the time point at which the point is touched) to the server 104, and accordingly the server 104 may collect and analyze the face image and the location information. The server 104 may collect the training data from the user terminal 102, store the training data in a database (not shown), and perform an analysis process (e.g., extracting a face vector, ocular image/location coordinates, and face image/location coordinates) performed by the user terminal 102.

When the viewer touches the set point while the imaging device 204 is operating, the training data collection unit 208 may separately collect the pieces of training data at a time point at which the touch is made and time points a set time before and after the time point at which the touch is made (e.g., time points one second before the time point at which the touch is made and one second after the time point at which the touch is made). When the viewer intends to touch a specific point, the viewer generally looks at the point immediately before and after the touch. Therefore, not only training data collected at a time point at which a touch is actually made but also training data collected at time points immediately before and after the touch may be determined to be highly reliable. In other words, according to embodiments of the present invention, when the viewer touches a set point while the imaging device 204 is operating, pieces of training data are separately collected at a time point at which the touch is made and time points a set time before and after the time point at which the touch is made so that a large amount of training data with high reliability may be easily collected.

Figure 9:
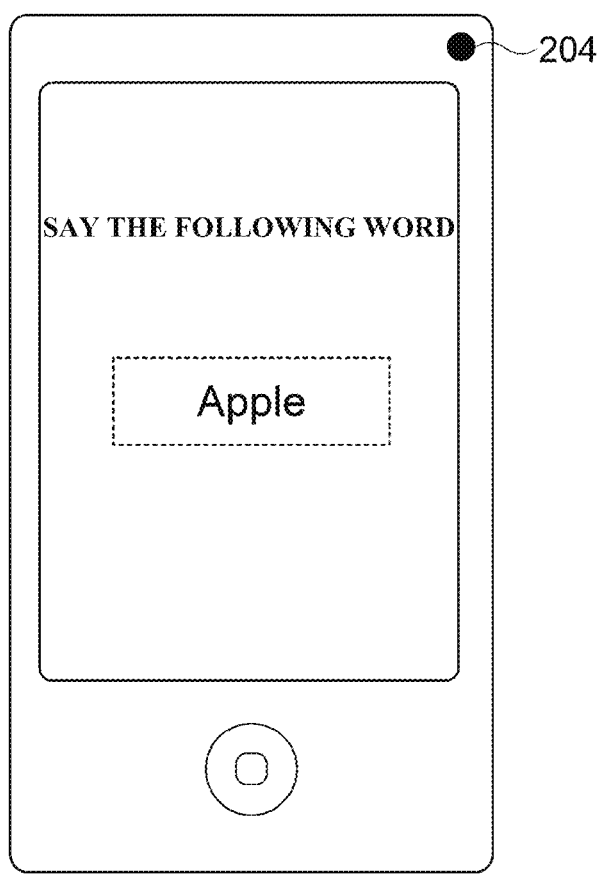
FIG. 9 is another example illustrating a process in which a training data collection unit collects training data which is input to a deep learning model according to an embodiment of the present invention.

FIG. 9 is another example illustrating a process in which the training data collection unit 208 collects training data which is input to the deep learning model 210 according to an embodiment of the present invention.

Referring to FIG. 9, the training data collection unit 208 may display set text at a specific point. When the viewer speaks in response to the text, the training data collection unit 208 may collect training data including a face image of the viewer captured through the imaging device 204 at a time point at which the utterance is started and the location information of the point. As an example, the training data collection unit 208 may display the text "Say the following word" and the text "Apple" in the upper and central parts of the screen, respectively. When the viewer reads the word "Apple" aloud, the training data collection unit 208 may collect training data including a face image of the viewer captured through the imaging device 204 at a time point at which the utterance is started and the location information of the point at which the text "Apple" is displayed.

As such, according to embodiments of the present invention, when an action, such as a touch or an utterance, is input from a viewer who is looking at a set point in the screen, a face image of the viewer captured at a time point at which the action is input and location information of the point is used as training data of the deep learning model 210 for eye tracking. Consequently, it is possible to improve the accuracy and reliability of eye tracking.

Figure 10:
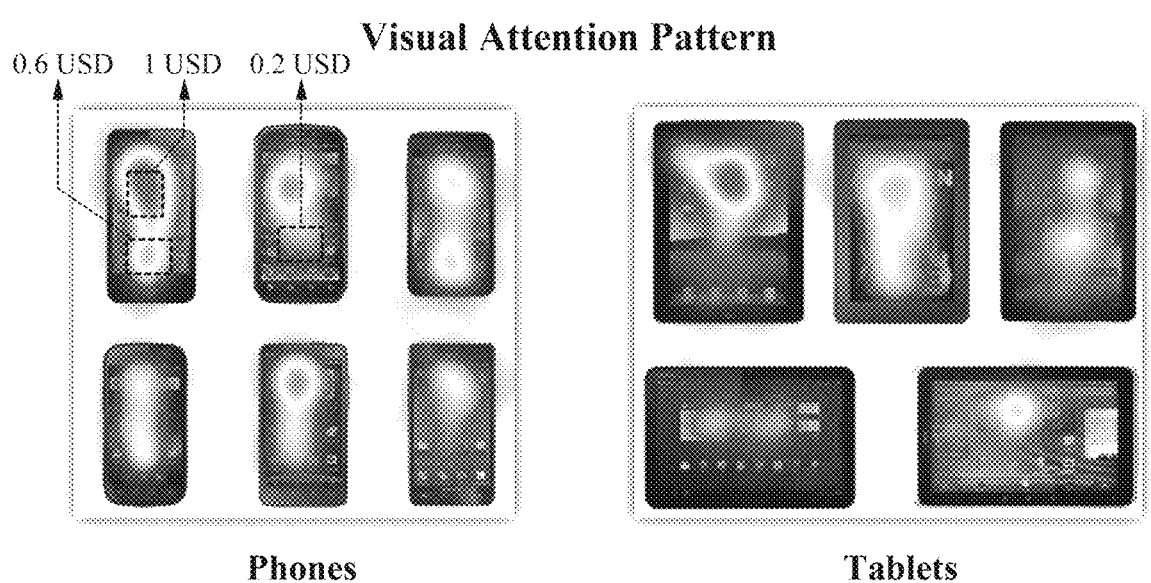
FIG. 10 is an example illustrating a gaze-based bidding method according to an embodiment of the present invention.

FIG. 10 is an example illustrating a gaze-based bidding method according to an embodiment of the present invention. The eye tracking unit 206 may determine whether a user is watching advertising content in a screen by comparing a detected gaze of the user with the location of the advertising content in the screen and, accordingly, at which location the user has frequently watched advertising content may be determined. The eye tracking unit 206 may calculate a time period and the number of times that the user has watched advertising content in each region and provide the calculated results to the server 104. Accordingly, the server 104 may make different bids for advertising content according to regions at which the advertising content is located in conjunction with the advertiser terminal 106.

Referring to FIG. 10, the server 104 may make a bid of one dollar for advertising content at a region that is relatively frequently looked at by the user and a bid of 60 cents for advertising content at a region that is relatively infrequently looked at by the user and charge the advertiser terminal 106 for the advertising content.

Also, the content providing unit 202 may change the location of the advertising content in the screen by considering the location of the advertising content in the screen and a time period for which the user has watched the advertising content. For example, the content providing unit 202 may detect a region that has been looked at a set number of times or for a set time period or more among a plurality of regions in which the advertising content has been displayed and change a location at which the advertising content is currently being displayed for the region that has been looked at the set number of times or more or for the set time period or more. Accordingly, the user may be induced to watch the advertising content more.

Figure 11:
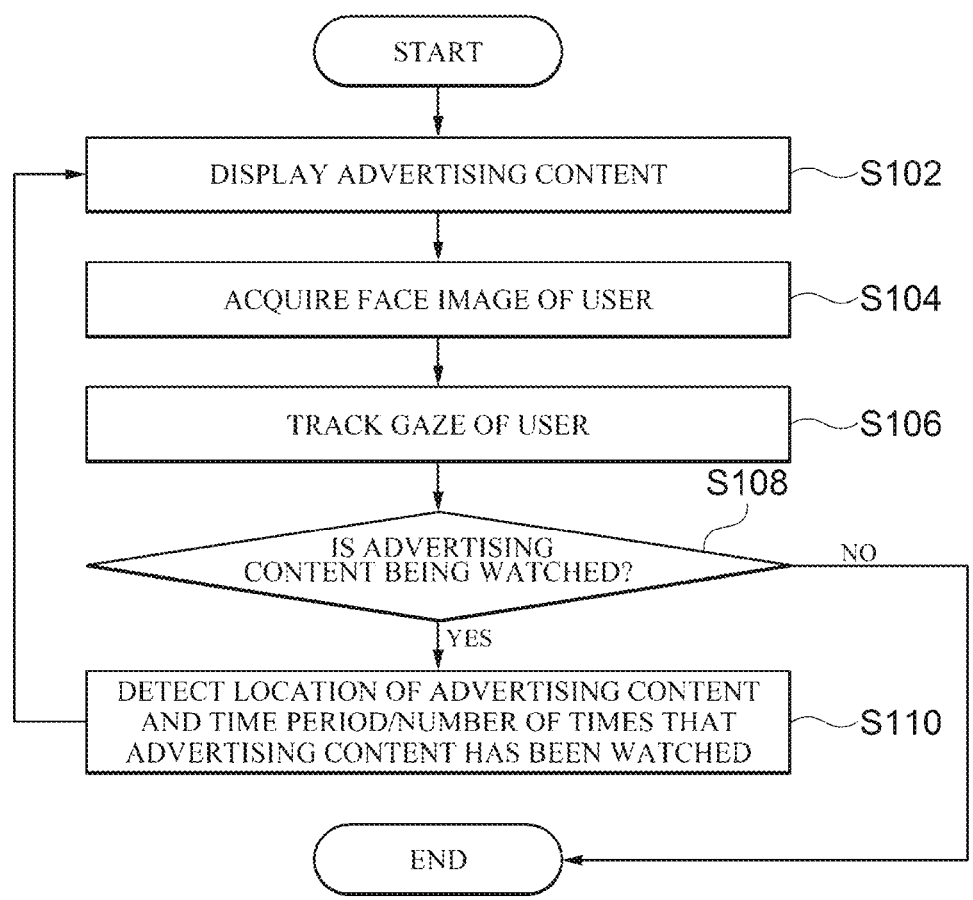
FIG. 11 is a flowchart illustrating an eye tracking method according to an embodiment of the present invention.

FIG. 11 is a flowchart illustrating an eye tracking method according to an embodiment of the present invention. Although the method is illustrated as being divided into a plurality of operations in the flowchart shown in the drawing, at least some of the operations may be performed in a different order or in combination with other operations, omitted, or subdivided into more operations and performed, or one or more operations which are not shown may be added to the flowchart and performed.

In operation S102, the content providing unit 202 displays advertising content on a screen.

In operation S104, the eye tracking unit 206 acquires a face image of a user through the imaging device 204.

In operation S106, the eye tracking unit 206 tracks the gaze of the user using a set rule-based algorithm and deep learning model. A method in which the eye tracking unit 206 tracks the gaze of the user using the rule-based algorithm and deep learning model has been described in detail above, and the detailed description thereof is not reiterated here.

In operation S108, the eye tracking unit 206 determines whether the user is watching the advertising content on the basis of a detected gaze of the user and the location of the advertising content in the screen.

In operation S110, when it is determined that the user is watching the advertising content, the eye tracking unit 206 detects the location of the advertising content in the screen, a time period/the number of times that the viewer has watched the advertising content, and the like.

Figure 12:
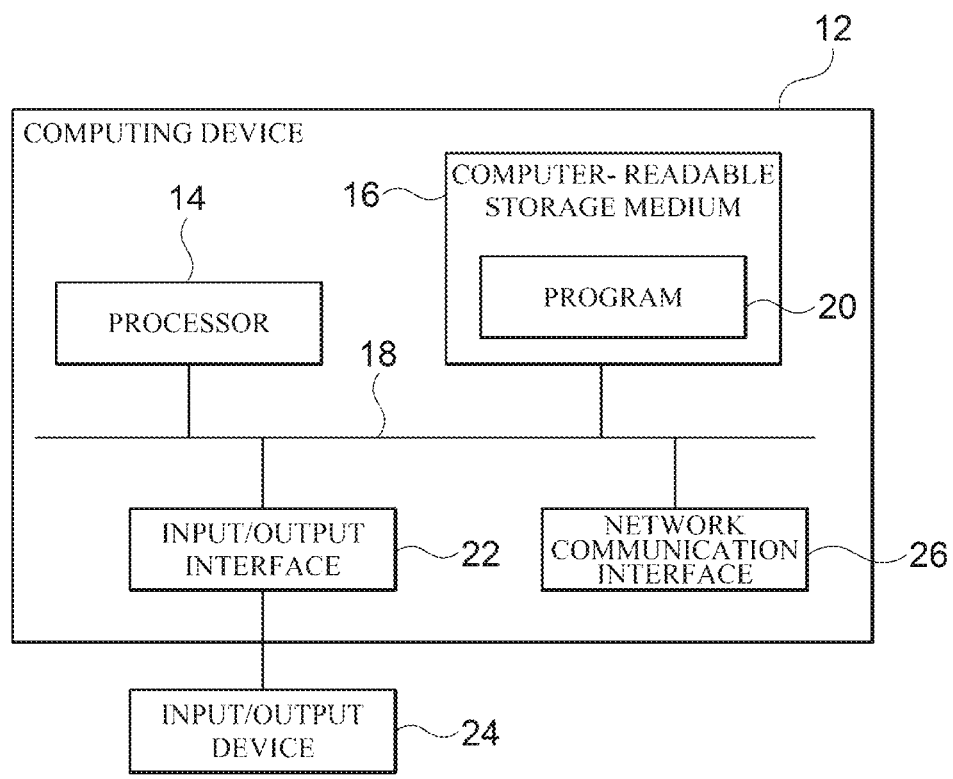
FIG. 12 is a block diagram illustrating a computing environment including a computing device appropriate for exemplary embodiments.

FIG. 12 is a block diagram illustrating a computing environment 10 including a computing device appropriate for exemplary embodiments. In the illustrated embodiment, each component may have a function and a capability different from those described below, and additional components may be included in addition to the components described herein.

The illustrated computing environment 10 includes a computing device 12. In an embodiment, the computing device 12 may be one or more components included in the advertising system 100 or the user terminal 102.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer-executable commands, and the computer-executable commands may be configured to cause the computing device 12 to perform operations according to the exemplary embodiment when executed by the processor 14.

The computer-readable storage medium 16 is configured to store computer-executable commands, program code, program data, and/or information in other suitable forms. Programs 20 stored in the computer-readable storage medium 16 include a set of commands executable by the processor 14. In an embodiment, the computer-readable storage medium 16 may be a memory (a volatile memory such as a random access memory (RAM), a non-volatile memory, or a combination thereof), one or more magnetic disk storage devices, optical disk storage devices, flash memory devices, other forms of storage media that are accessible by the computing device 12 and may store desired information, or a combination thereof.

The communication bus 18 connects various other components of the computing device 12 including the processor 14 and the computer-readable storage medium 16 to each other.

The computing device 12 may include at least one input/output interface 22 which provides an interface for at least one input/output device 24 and at least one network communication interface 26. The input/output interface 22 and the network communication interface 26 are connected to the communication bus 18. The input/output device 24 may be connected to other components of the computing device 12 through the input/output interface 22. The exemplary input/output device 24 may include an input device, such as a pointing device (a mouse, a track pad, or the like), a keyboard, a touch input device (a touch pad, a touch screen, or the like), a voice or sound input device, various types of sensor devices, and/or an imaging device, and/or an output device such as a display device, a printer, a speaker, and/or a network card. The exemplary input/output device 24 may be included in the computing device 12 as a component constituting the computing device 12 or may be connected to the computing device 12 as a separate device from the computing device.

Although the present invention has been described in detail above with reference to the exemplary embodiments, those of ordinary skill in the technical field to which the present invention pertains should understand that various modifications can be made without departing from the scope of the present invention. Therefore, the scope of the present invention should not be limited to the above-described embodiments and should be defined by the following claims and equivalents to the claims.

The invention claimed is:

1. A user terminal comprising:
an imaging device configured to capture a face image of a user; and
at least one processor configured to execute program codes to perform:
acquiring a vector representing a direction that a face of the user faces and an ocular image of the user from the face image on the basis of set rules; and
tracking a gaze of the user by inputting the face image, the vector, and the ocular image to a set deep learning model,
wherein the deep learning model has been trained with training data including a face image of a viewer and location information of a set point which the viewer looks at in a screen;
the training data is collected at a time point at which the viewer touches the point or the viewer looks the point or an utterance of the viewer related to text displayed at the point is started, and
wherein the imaging device is maintained in an off state and operated to photograph the viewer at a time point at which the viewer touches the point.

2. The user terminal of claim 1, wherein the tracking of the gaze of the user comprises tracking the gaze of the user using the deep learning model which has learned the training data.

3. The user terminal of claim 1, wherein the training data is collected by the imaging device operating at the time point at which the viewer touches the point.

4. The user terminal of claim 1, wherein the at least one processor is further configured to execute program to perform transmitting the training data collected at the time point at which the viewer touches the point to a server.

5. The user terminal of claim 1, wherein, when the viewer touches the point while the imaging device is operating, the training data is separately collected at the time point at which the touch is made and time points a set time before and after the time point at which the touch is made.

6. The user terminal of claim 1, wherein the at least one processor is further configured to execute program to perform changing a visual element of the point after the viewer touches the point so that a gaze of the viewer remains at the point even after the touch.

7. The user terminal of claim 1, wherein the at least one processor is further configured to execute program to perform acquiring ocular location coordinates and face location coordinates of the user from the face image on the basis of the rules;
the tracking of the gaze of the user comprises additionally inputting the ocular location coordinates and the face location coordinates to the deep learning model together with the vector representing the direction that the face of the user faces.

8. The user terminal of claim 1, wherein the at least one processor is further configured to execute program to perform:
displaying advertising content on the screen,
determining whether the user is watching the advertising content on the basis of a detected gaze of the user and a location of the advertising content in the screen; and
changing the location of the advertising content in the screen by considering the location of the advertising content in the screen and a time period for which the user has watched the advertising content.

9. An eye tracking method comprising:
capturing, by an imaging device, a face image of a user;
acquiring, by an eye tracking unit, a vector representing a direction in that a face of the user faces and an ocular image of the user from the face image on the basis of set rules; and
inputting, by the eye tracking unit, the face image, the vector, and the ocular image to a set deep learning model to track a gaze of the user,
wherein the deep learning model has been trained with training data including a face image of a viewer and location information of a set point which the viewer looks at in a screen;
the training data is collected at a time point at which the viewer touches the point or the viewer looks the point or an utterance of the viewer related to text displayed at the point is started; and
wherein the imaging device is maintained in an off state and operated to photograph the viewer at a time point at which the viewer touches the point.

10. The eye tracking method of claim 9,
wherein the tracking of the gaze of the user comprises tracking the gaze of the user by using the deep learning model which has learned the training data.

11. The eye tracking method of claim 9, wherein the collecting of the training data comprises collecting the training data by operating the imaging device at the time point at which the viewer touches the point.

12. The eye tracking method of claim 9, further comprising transmitting, by the training data collection unit, the training data collected at the time point at which the viewer touches the point to a server.

13. The eye tracking method of claim 9, wherein the collecting of the training data comprises, when the viewer touches the point while the imaging device is operating, separately collecting the training data at the time point at which the touch is made and time points a set time before and after the time point at which the touch is made.

14. The eye tracking method of claim 9, further comprising changing, by the training data collection unit, a visual element of the point after the viewer touches the point so that a gaze of the viewer remains at the point even after the touch.

15. The eye tracking method of claim 9, further comprising acquiring, by the eye tracking unit, ocular location coordinates and face location coordinates of the user from the face image on the basis of the rules,
wherein the tracking of the gaze of the user comprises additionally inputting the ocular location coordinates and the face location coordinates to the deep learning model together with the vector representing the direction that the face of the user faces.

16. The eye tracking method of claim 9, further comprising:
displaying, by a content providing unit, advertising content on the screen;
determining, by the eye tracking unit, whether the user is watching the advertising content on the basis of a detected gaze of the user and a location of the advertising content in the screen; and
changing, by the content providing unit, the location of the advertising content in the screen by considering the location of the advertising content in the screen and a time period for which the user has watched the advertising content.

* * * * *